(12) United States Patent
Kuehnemund et al.

(10) Patent No.: US 6,367,650 B1
(45) Date of Patent: Apr. 9, 2002

(54) FUEL TANK COVER ASSEMBLY FOR FUEL TANK

(75) Inventors: Bruce Albert Kuehnemund, Flushing; Kevin J. Szeszulski, Bay City; Robert Lee Farrar, Flint; David E. Almquist, Burton; Anthony P. Nedela, Davison; Dale Richard Jones, Flushing; Gerald E. Wirostek, Burton, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/578,588

(22) Filed: May 25, 2000

(51) Int. Cl.⁷ .................................................. B65D 1/42
(52) U.S. Cl. ........................ 220/651; 220/562; 123/514
(58) Field of Search ................................ 220/651, 730, 220/562; 123/509, 514; 137/574

(56) References Cited

U.S. PATENT DOCUMENTS

| 4,678,097 A | * | 7/1987 | Crute .......................... 220/288 |
| 5,018,546 A | * | 5/1991 | Carmack et al. ......... 137/68.15 |
| 5,070,849 A | * | 12/1991 | Rich et al. ................... 123/509 |
| 5,762,049 A | * | 6/1998 | Jones et al. ................. 123/514 |
| 6,213,100 B1 | | 4/2001 | Johansen ..................... 123/509 |

* cited by examiner

*Primary Examiner*—Mickey Yu
*Assistant Examiner*—Troy Arnold
(74) *Attorney, Agent, or Firm*—Vincent A. Cichosz

(57) ABSTRACT

A fuel tank cover assembly for a fuel tank of a vehicle includes a cover adapted to close an opening in the fuel tank having a fuel reservoir disposed therein and an insert disposed within the cover and adapted to decouple inertia of the fuel reservoir from the cover under severe impact conditions.

17 Claims, 4 Drawing Sheets

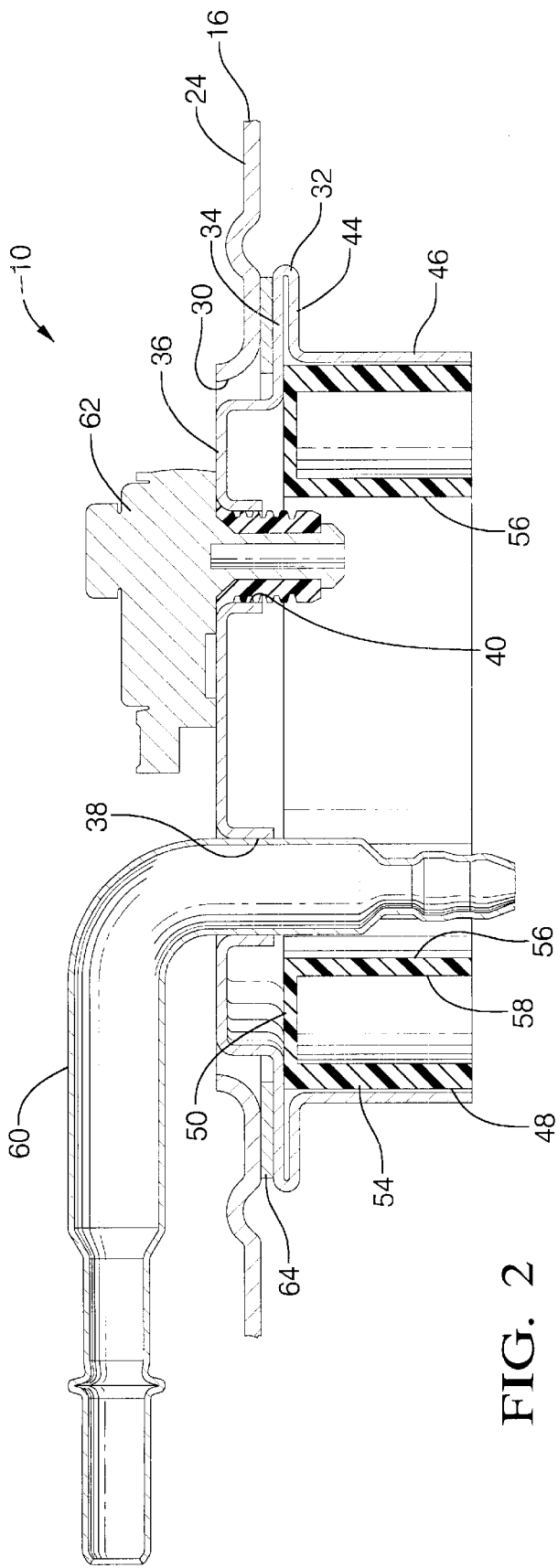
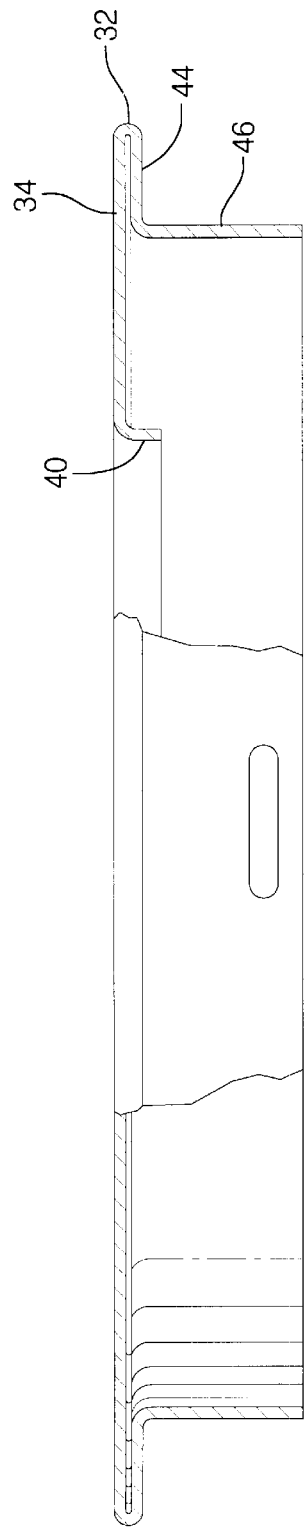
FIG. 2
FIG. 3

FUEL TANK COVER ASSEMBLY FOR FUEL TANK

TECHNICAL FIELD

The present invention relates generally to fuel tanks for vehicles and, more particularly, to a fuel tank cover assembly for a fuel tank of a vehicle.

BACKGROUND OF THE INVENTION

It is known to provide a fuel tank such as a plastic fuel tank in a vehicle to hold fuel to be used by an engine of the vehicle. In such a fuel tank, a cover is provided for a fuel reservoir. The cover typically has fuel tubes, electrical connector, and rollover valve attached thereto. The cover is made entirely out of a plastic or metal material. Guide rod retainers and rollover valve bracket are welded to the metal cover, resulting in process variation between covers of fuel tanks. One concern with these fuel tanks is that the guide rods are rigidly attached to the metal cover and under severe impact conditions, the guide rods may damage the cover and sealing surface by tearing a hole in the cover or deforming the cover, resulting in a leak path, by retaining the inertia of the fuel reservoir.

Therefore, it is desirable to provide a fuel tank cover assembly for a vehicle that allows the guide rods to break away under severe impact conditions. It is also desirable to provide a fuel tank cover assembly that eliminates welding of the guide rods to the cover for a fuel tank.

SUMMARY OF THE INVENTION

It is, therefore, one object of the present invention to provide a new fuel tank cover assembly for a fuel tank of a vehicle.

It is another object of the present invention to provide a fuel tank cover assembly with a separate cover and a breakaway insert adapted to decouple inertia of the fuel reservoir from the cover.

To achieve the foregoing objects, the present invention is a fuel tank cover assembly for a fuel tank of a vehicle including a cover adapted to close an opening in the fuel tank having a fuel reservoir disposed therein and an insert disposed within the cover and adapted to decouple inertia of the fuel reservoir from the cover under severe impact conditions.

One advantage of the present invention is that a fuel tank cover assembly is provided for fuel tank of a vehicle that includes a metal cover with a one-piece plastic insert. Another advantage of the present invention is that the fuel tank cover assembly retains the guide rods and allows the guide rods to break away under severe impact conditions along with protecting a wire harness and fuel tubes from rubbing on a metal skirt. Yet another advantage of the present invention is that the fuel tank cover assembly can also be used to retain the electrical connector and the rollover valve. Still another advantage of the present invention is that the fuel tank cover assembly reduces cost by eliminating welding of the guide rods and bracket to the cover. A further advantage of the present invention is that the fuel tank cover assembly improves quality by having the guide rod retainer and rollover valve feature molded in the same place each time, thereby reducing process variation. Yet a further advantage of the present invention is that the fuel tank cover assembly improves performance by incorporating a plastic insert into a metal cover, which will allow the fuel reservoir to break away from the cover under severe impact conditions.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 2 is a sectional view taken along line 2—2 of FIG. 1.

FIG. 3 is a fragmentary elevational view of a over of the fuel tank cover assembly of FIG. 1.

DESCRIPTION OF THE PREFERRED EMBODIMENT

Figure 1:
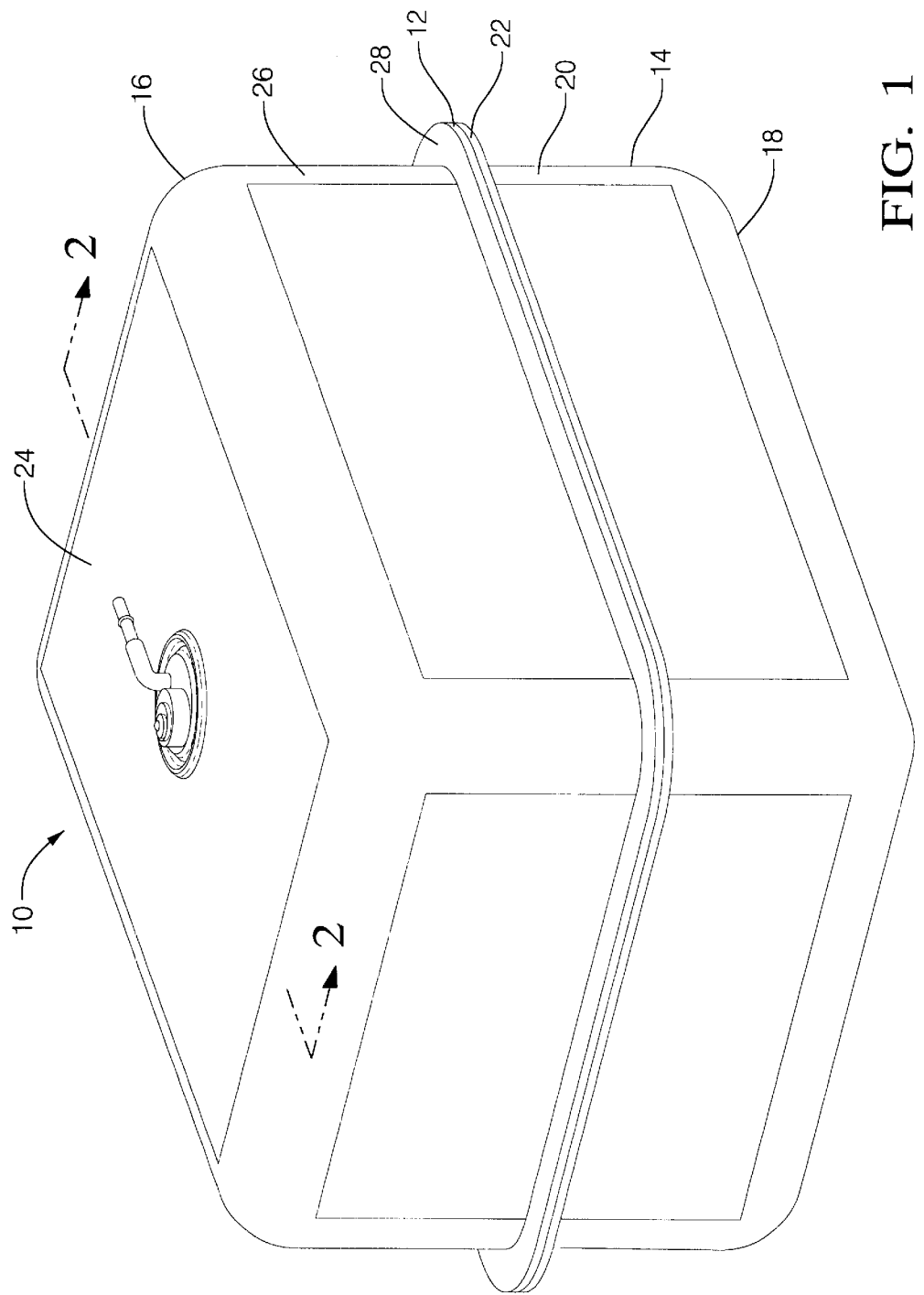
FIG. 1 is a perspective view of a fuel tank over assembly, according to the present invention, illustrated in operational relationship with a fuel tank.

Referring to the drawings and in particular FIGS. 1 and 2, one embodiment of a fuel tank cover assembly 10, according to the present invention, is shown for a fuel tank 12 of a vehicle (not shown). The fuel tank 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together by suitable means such as by welding. The lower half shell 14 and upper half shell 16 are made of a rigid material such as plastic. The base wall 24 of the upper half shell 16 includes an opening 30 for the fuel tank cover assembly 10. It should be appreciated that, except for the fuel tank cover assembly 10, the fuel tank 12 is conventional and known in the art.

Referring to FIGS. 1 through 4, the fuel tank cover assembly 10 includes a cover 32 to cover or close the opening 30. The cover 32 is generally circular in shape. The cover 32 includes a base wall 34 having a raised portion 36. The raised portion 36 has at least one, preferably a plurality of apertures 38, 40 and 42 extending therethrough for a function to be described. The cover 32 also includes a flange wall 44 extending under and radially inwardly from the base wall 34 in an overlapping manner. The cover 32 includes a skirt or side wall 46 extending generally perpendicular and axially from the flange wall 44. The cover 32 is made from a metal material such as steel, which is conventional and known in the art.

The fuel tank cover assembly 10 also includes a breakaway insert 48 disposed within and molded to the cover 32. The insert 48 is generally circular in shape. The insert 48 has a base wall 50 that is generally planar and circular in shape. The base wall 50 has a plurality of apertures or cutout portions 52 extending therethrough to allow fuel tubes 60 to be described to extend therethrough. The base wall 50 is disposed adjacent the base wall 34 of the cover 32. The insert 48 also includes a side wall 54 extending generally perpendicular from the base wall 50. The side wall 54 is disposed adjacent the side wall 46 of the cover 32. The insert 48 includes at least one, preferably a plurality of guide rod retainers 56. The guide rod retainers 56 are generally cylindrical and circular in shape. The guide rod retainers 56 have a cavity 58 extending axially therein for a function to be described. The guide rod retainers 56 extend axially from the base wall 50 and radially from the side wall 54. The insert 48 is made from a plastic material such as a polyethylene. It should be appreciated that the insert 48 is a monolithic structure being integral, unitary, and one-piece.

The fuel tank cover assembly 10 may include at least one, preferably a plurality of fuel tubes 60 extending into and through the apertures 30 of the cover 32. The fuel tank cover assembly 10 may include a rollover valve 62 extending into and through the aperture 40 of the cover 32. The fuel tank cover assembly 10 may include an electrical connector (not shown) extending into and through the aperture 42. It should be appreciated that the insert 48 will retain and orientate the guide rods 66 to be described and the rollover valve 62. It should also be appreciated that the fuel tubes 60, rollover valve 62 and electrical connector are conventional and known in the art.

In manufacturing the fuel tank cover assembly 10, the insert 48 is molded to the bottom side of the cover 32 by conventional processes such as injection molding. The fuel tubes 60, rollover valve 62 and electrical connector are assembled to the cover 32. The cover 32 is secured to the base wall 24 of the upper half shell 16 by an interlayer 64 of plastic material forming a weld therebetween. It should be appreciated that the insert 48 has the guide rod retainers 56 and rollover valve features molded in the same place each time. It should also be appreciated that the process of securing the metal cover 32 to the plastic base wall 24 is conventional and known in the art.

Figure 4:
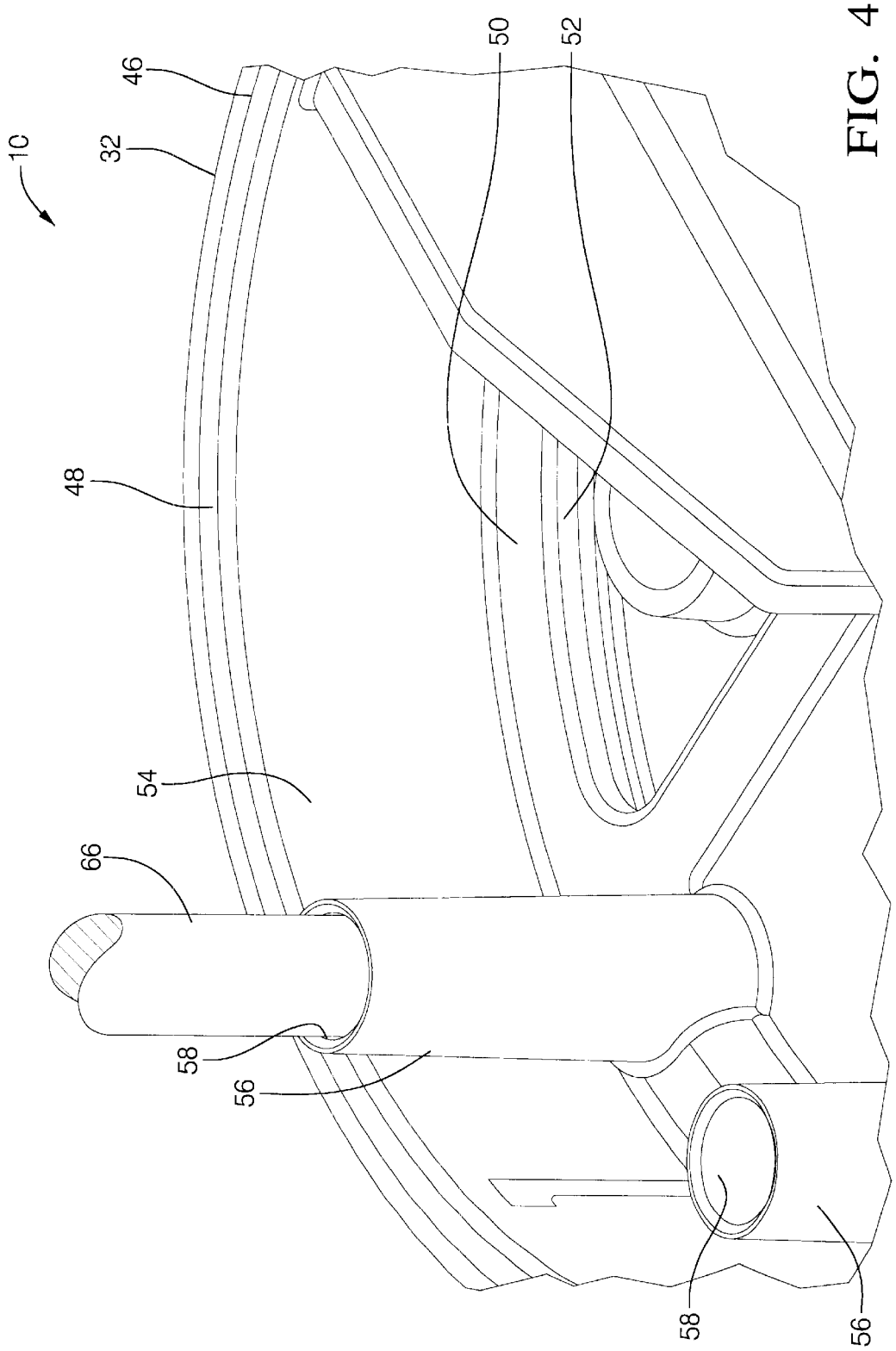
FIG. 4 is a partial perspective view of the fuel tank cover assembly of FIG. 1 illustrating a first operational state.
Figure 5:
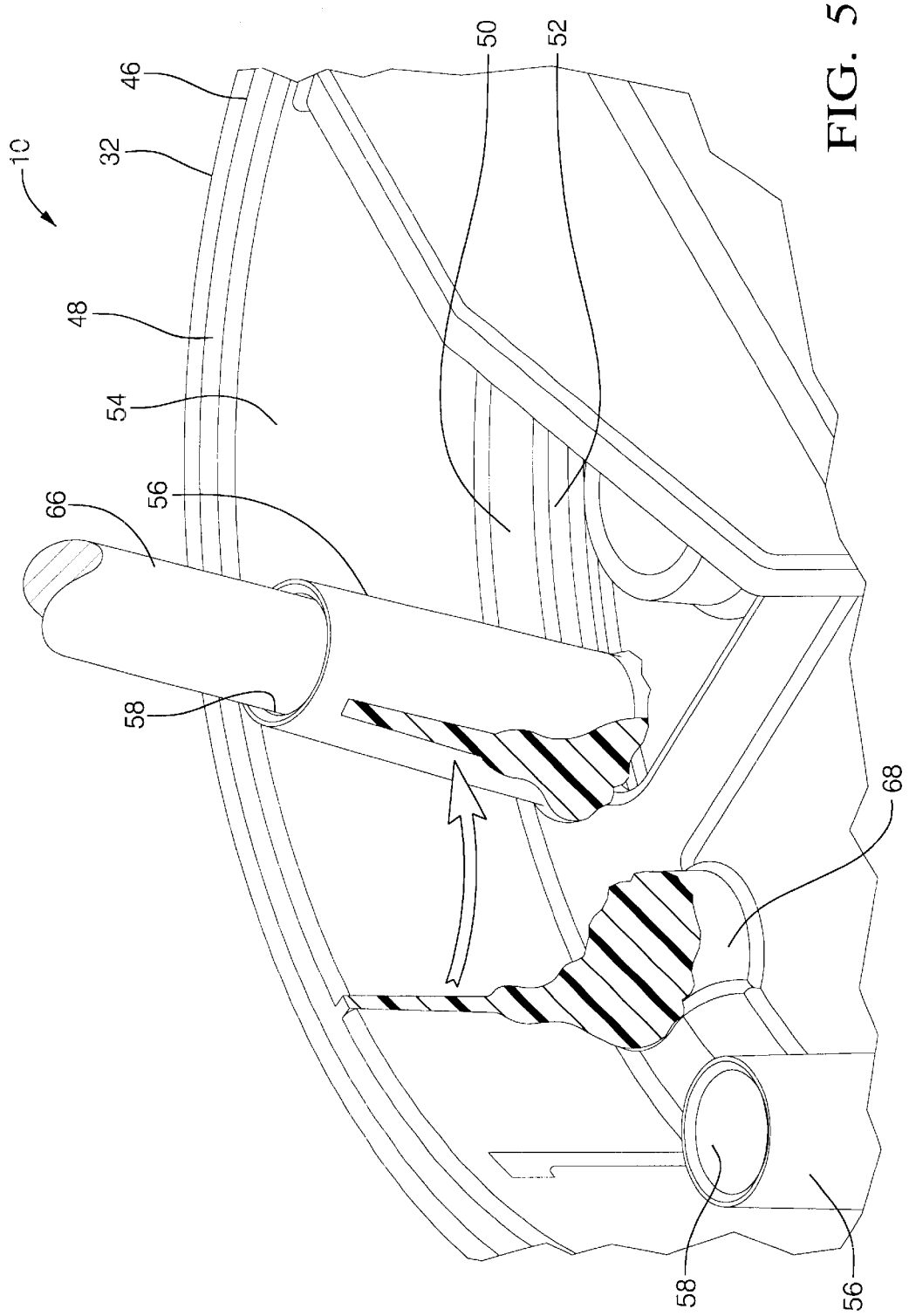
FIG. 5 is a view similar to FIG. 4 of the fuel tank cover assembly illustrating a second operational state.

Referring to FIG. 4, the fuel tank 12 has a fuel reservoir (not shown) with guide rods 66 extending upwardly and disposed in the cavities 58 of the guide rod retainers 56. The guide rod retainers 56 retain the guide rods 66 to the cover 32. Under severe impact conditions, the guide rod retainers 56 break-away from a guide rod boss 68 of the insert 48, thereby allowing the guide rods 66 to break-away from the metal cover 32 and leaving the metal cover sealing interfaces unaffected as illustrated in FIG. 5. As a result, the cover 32 and sealing interface thereof will not be damaged by retaining the inertia of the fuel reservoir. It should be appreciated that the fuel tank cover assembly 10 allows the guide rods 66 to break-away under severe impacts greater than 65 G's in a time period of approximately 15 milliseconds.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank cover assembly for a fuel tank of a vehicle comprising:
    a metal cover for closing an opening in the fuel tank having a fuel reservoir disposed therein, said cover having a first base wall extending radially; and
    a separate plastic insert disposed under said first base wall and within said cover having at least one guide rod retainer to retain a guide rod of the fuel reservoir and to decouple inertia of the fuel reservoir from said cover under severe impact conditions.

2. A fuel tank cover assembly as set forth in claim 1 wherein said insert has a second base wall extending radially and a side wall extending axially from said second base wall.

3. A fuel tank cover assembly as set forth in claim 2 wherein said at least one guide rod retainer is connected to at least one of said second base wall and said side wall and having a cavity therein to receive the guide rod of the fuel reservoir.

4. A fuel tank cover assembly as set forth in claim 1 wherein said cover has a side wall extending axially from said first base wall.

5. A fuel tank cover assembly as set forth in claim 4 wherein said first base wall has a plurality of apertures extending therethrough.

6. A fuel tank cover assembly as set forth in claim 5 including at least one fuel tube extending into and through at least one of said apertures.

7. A fuel tank cover assembly as set forth in claim 5 including a rollover valve extending into and through at least one of said apertures.

8. A fuel tank cover assembly as set forth in claim 5 including an interlayer between said first base wall and a wall of the fuel tank.

9. A fuel tank cover assembly as set forth in claim 1 wherein said insert is molded to said cover.

10. A fuel tank cover assembly for a fuel tank of a vehicle comprising:
    a metal cover for closing an opening in the fuel tank having a fuel reservoir disposed therein, said cover having a first base wall extending radially and a first side wall extending axially from said first base wall; and
    a separate plastic insert disposed under said first base wall and within said cover having at least one guide rod retainer with a cavity therein to receive a guide rod of the fuel reservoir and to break-away from said insert to decouple inertia of the fuel reservoir from said cover under severe impact conditions.

11. A fuel tank cover assembly as set forth in claim 10 wherein said insert has a second base wall extending radially and disposed adjacent said first base wall and a second side wall extending axially from said second base wall and disposed adjacent said first side wall.

12. A fuel tank cover assembly as set forth in claim 11 wherein said at least one guide rod retainer is connected to at least one of said base wall and said side wall.

13. A fuel tank cover assembly as set forth in claim 10 wherein said first base wall has a plurality of apertures extending therethrough.

14. A fuel tank cover assembly as set forth in claim 13 including at least one fuel tube extending into and through at least one of said apertures.

15. A fuel tank cover assembly as set forth in claim 13 including a rollover valve extending into and through at least one of said apertures.

16. A fuel tank cover assembly as set forth in claim 13 wherein said insert is molded to said cover.

17. A fuel tank for a vehicle comprising:
    a fuel tank having an opening formed in a wall thereof for containing a fuel reservoir therein;
    a fuel tank cover assembly to close said opening; and
    wherein said fuel tank cover assembly comprises a metal cover having a first base wall extending radially and a separate plastic insert disposed under said first base wall by molding to said cover, said insert having at least one guide rod retainer to retain a guide rod of the fuel reservoir and to break-away from the insert to decouple inertia of the fuel reservoir from said cover under severe impact conditions.

* * * * *